(12) United States Patent
Metten

(10) Patent No.: US 10,815,150 B2
(45) Date of Patent: Oct. 27, 2020

(54) METHOD FOR PRODUCING CONCRETE ELEMENTS

(71) Applicant: METTEN Stein+Design GmbH & Co. KG, Overath (DE)

(72) Inventor: Michael Metten, Bergisch Gladbach (DE)

(73) Assignee: METTEN Stein+Design GmbH & Co. KG, Overath (DE)

(*) Notice: Subject to any disclaimer, the term of this patent is extended or adjusted under 35 U.S.C. 154(b) by 717 days.

(21) Appl. No.: 15/321,846

(22) PCT Filed: Jul. 10, 2015

(86) PCT No.: PCT/EP2015/065852
§ 371 (c)(1),
(2) Date: Dec. 23, 2016

(87) PCT Pub. No.: WO2016/005566
PCT Pub. Date: Jan. 14, 2016

(65) Prior Publication Data
US 2017/0129811 A1    May 11, 2017

(30) Foreign Application Priority Data

Jul. 11, 2014    (DE) .................. 10 2014 010 259

(51) Int. Cl.
*C04B 18/02* (2006.01)
*B28B 1/00* (2006.01)
*B28B 1/087* (2006.01)
*B28B 11/04* (2006.01)
*B28B 13/02* (2006.01)
*C04B 40/00* (2006.01)
*C04B 28/02* (2006.01)

(52) U.S. Cl.
CPC ............ *C04B 18/022* (2013.01); *B28B 1/005* (2013.01); *B28B 1/087* (2013.01); *B28B 11/04* (2013.01);

(Continued)

(58) Field of Classification Search
CPC ... C04B 18/022; C04B 28/02; C04B 40/0067; C04B 18/021; B28B 13/02; B28B 13/028; B28B 13/022; B28B 1/087; B28B 1/005
See application file for complete search history.

(56) References Cited

U.S. PATENT DOCUMENTS 6,461,552 B1    10/2002    Geiger
7,935,284 B2    5/2011    Metten
(Continued)

FOREIGN PATENT DOCUMENTS

CN    1144784    3/1997
DE    10146408    4/2003
(Continued)

OTHER PUBLICATIONS

English translation for DE202009013082 (Year: 2010).*

*Primary Examiner* — Joseph S Del Sole
*Assistant Examiner* — Mohamed K Ahmed Ali
(74) *Attorney, Agent, or Firm* — Honigman LLP; Andrew S. Chipouras; Kelly T. Murphy

(57) ABSTRACT

Presented and described is a method for manufacturing concrete elements having at least one concrete layer, wherein concrete for at least one element is introduced into a mould, the concrete is compacted by vibration and/or by tamping and subsequently cures, wherein to the concrete layer, prior to compaction, at least one portion of a granular material is applied by means of an application device, where the concrete introduced into the mould has a water/binder (w/b) ratio of 0.30 to 0.50 prior to curing and where as granular material a material is used comprising (a) a scatter component having an average particle diameter of 0.1 to 5 mm in an amount of 65 to 95 wt % and (b) binder in an amount of 5 to 35 wt %, based in each case on the overall composition of the granular material.

38 Claims, 1 Drawing Sheet

(52) U.S. Cl.
CPC ............ *B28B 13/02* (2013.01); *B28B 13/022* (2013.01); *B28B 13/028* (2013.01); *C04B 18/021* (2013.01); *C04B 28/02* (2013.01); *C04B 40/0067* (2013.01); *Y02W 30/92* (2015.05); *Y02W 30/94* (2015.05); *Y02W 30/96* (2015.05)

(56) References Cited

U.S. PATENT DOCUMENTS

| | | | |
|---|---|---|---|
| 2006/0207479 A1* | 9/2006 | Hughes | C04B 28/02 106/705 |
| 2007/0234679 A1 | 10/2007 | Metten | |
| 2012/0280178 A1 | 11/2012 | Henning | |
| 2014/0336305 A1* | 11/2014 | Shink | C04B 40/0046 523/220 |

FOREIGN PATENT DOCUMENTS

| | | |
|---|---|---|
| DE | 202009013082 | 2/2010 |
| EP | 0813942 | 12/1997 |
| EP | 1017554 | 9/2003 |
| EP | 1431014 | 6/2004 |
| EP | 1827784 | 4/2012 |
| WO | WO1999057076 | 11/1999 |

\* cited by examiner

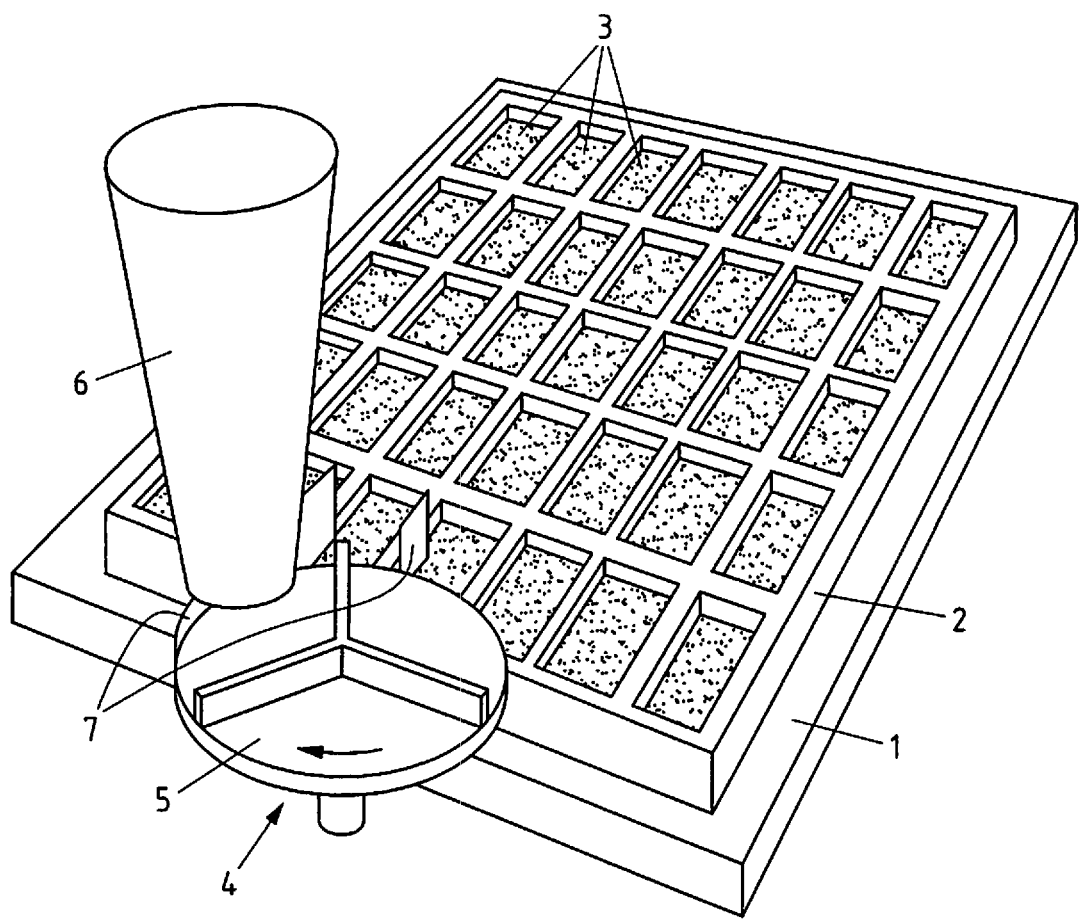

METHOD FOR PRODUCING CONCRETE ELEMENTS

PRIORITY CLAIM

This application is the United States National Stage filing of PCT/EP2015/065852 filed Jul. 10, 2015, which claims priority to German Application DE 102014010259.9 filed Jul. 11, 2014. The entire contents of the aforementioned applications are incorporated herein by reference.

The invention relates to a method for manufacturing concrete elements such as concrete blocks or concrete slabs in different formats and sizes and having at least one concrete layer, wherein concrete is introduced into a mould for at least one element, the concrete is compacted by vibration and/or by tamping and subsequently cures, wherein to the concrete layer, prior to compaction, at least one portion of a granular material is applied, by means of an application device. The invention further relates to concrete elements produced by this method.

Concrete blocks are currently in use for a multiplicity of applications, primarily in the construction sector. Here it is above all the diversity of this material that is prized. To start with, its properties can be modified easily by various additions. Moreover, the external appearance as well can be influenced by suitable production methods.

An important basic ingredient of concrete is cement. The primary function of the cement is as a binder for the additions that are used, such as the aggregates, for example. In the production of concrete, the properties of the product obtained are greatly affected by what is called the water/binder ratio (w/b ratio). This ratio describes the relation between the mass of the mixing water and the mass of the binder (normally cement) in a compacted mixture. When additives such as slag sand, pozzolan, flyash, limestone, bituminous-coal flyash or silica dust are used, the relevant mass of the binder in the calculation of the w/b ratio is not only the mass of the cement alone, but also the mass of these additives, which must be added to the mass of the cement.

Depending on the water/binder ratio, different kinds of concrete are obtained with different mechanical properties, particularly in respect of the concrete's compressive strength.

On curing, a typical cement is able to bind around 40% of its mass of water. This corresponds to a w/b ratio of 0.40. At a w/b ratio of more than 0.4, there is more water in the mixture than the cement is able to bind. A consequence of this is the increased formation of pores in the concrete, which may lower the compressive strength. There is also an increase in sensitivity to frost. The lower the w/b ratio, the stiffer and less workable the concrete is. Furthermore, at low w/b ratios, there is a risk that not all of the binder will cure, thereby lowering the compressive strength.

In addition, the surface of concrete blocks is often impregnated or sealed using epoxy resins, for example. This allows the concrete block to be protected from environmental effects, such as water penetration, for example, which extends the lifetime of the concrete element. The sealing of the concrete elements, however, entails additional worksteps, which raise the costs of producing the concrete elements.

In the production of concrete blocks it is usual first to introduce the rough concrete for concrete blocks and concrete slabs into the moulds, then introduce the facing concrete, and thereafter to compact the concrete blocks or concrete slabs.

An alternative possibility is to produce the concrete blocks or concrete slabs in a one-stage process without facing concrete.

In this context it is known to give the surface layer in the case of the one-stage process, or the facing concrete layer, a base colour, according to desire, which may match the concrete colour, without colouring, or may be coloured with different colours in order to produce different-coloured concrete blocks or concrete slabs.

Known additionally from EP 1 017 554 B1 is the production of the concrete mortar that forms the facing layer by means of differently coloured layers, which are stored one above the other in the supply container and are moved freely downwards in the supply container, whereupon they mix and, with guiding via baffles, go onto the rough concrete, in order to form a marbled facing layer, which is then compacted. This is a functioning process, but one which produces areas with different-coloured marbling, which only to a limited extent meet the optical requirements imposed on concrete blocks or concrete slabs which are intended to resemble natural stones, owing to the formation only of spotty colorations.

EP-A-1 431 014 describes a method for producing modular elements wherein microspheres are applied, strewn or laid on the concrete top layer or facing concrete layer, these microspheres consisting of pure glass, semi-pure glass or coated ceramic. The microspheres are embedded in the concrete top layer or facing concrete layer by means of a compacting operation. The elements are intended for use in road traffic, where the microspheres are to reflect the light from vehicles in order to increase traffic safety.

EP-A-0 813 942 describes a method for producing moulded articles, and shows a press for implementing the method. The aim here is to provide a method and a press generating considerably higher pressures than vibrational compaction or tamp pressing in the case of moulds. With this high pressure, the intention is then also to represent particular surface patterns or colour compositions in the outer layer, wherein a layer without added binder can also be pressed into the moulded article. As described in relation to the press, this is achieved by means of additional filling slides.

EP 1 827 784 B1, lastly, describes a method for producing concrete blocks or concrete slabs wherein at least one portion of a coloured and/or differently coloured granular material or of a granular material which has colour and/or different colours is thrown onto the surface or facing concrete layer, prior to compaction, by means of at least one application device.

In the production of concrete elements having a surface which resembles grained or speckled natural stones, problems are frequently encountered. For instance, the adhesion of the applied granular material on the surface represents one problem which is difficult to solve. Moreover, the completed concrete element, and in particular its surface, is ideally to have high wear resistance. Criteria having emerged as being important for the determination of the wear resistance are the compressive strength and the abrasion resistance. A high abrasion resistance particularly is important for concrete slabs with applied granular material for floorcoverings. Moreover, extended lifetime for the concrete elements has so far often necessitated the impregnating/sealing of the surface of the concrete elements. This, however, entails extra worksteps and the use of additional materials, and this raises the production costs. With the methods known in the prior art to date, it is not possible to produce concrete elements which overcome these drawbacks.

It is an object of the invention, therefore, to provide a method which allows the production of surfaces of concrete blocks and/or concrete slabs which very closely resemble grained and/or speckled natural stones. In this way, a structured surface is to originate in which directed veins and/or graining and/or speckling are predominant. Moreover, the concrete elements produced by the method of the invention are to exhibit improved compressive strength and/or abrasion resistance. Lastly, with the method of the invention, it is to be possible to produce concrete elements whose surface no longer requires sealing/impregnating.

This object is achieved in accordance with the invention by means of a method for manufacturing concrete elements having at least one concrete layer, wherein concrete for at least one element is introduced into a mould, the concrete is compacted by vibration and/or by tamping and subsequently cures, wherein to the concrete layer, prior to compaction, at least one portion of a granular material is applied by means of an application device, where the concrete introduced into the mould is adjusted prior to curing to a water/binder (w/b) ratio of 0.30 to 0.50 and where as granular material a material issued comprising (a) a scatter component having an average particle diameter of 0.1 to 5 mm in an amount of 65 to 95 wt % and (b) binder in an amount of 5 to 35 wt %, based in each case on the overall composition of the granular material.

The average particle diameter is understood by the skilled person to refer to that diameter at which there are equal numbers of particles having larger and having smaller diameters. Techniques for determining the average particle diameter are known to the skilled person.

Surprisingly it has been found that through the use of a scatter component having a defined average particle diameter (0.1 to 5 mm] and a defined binder fraction (5 to 35 wt %) in combination with the adjustment of the concrete introduced into the mould to a defined w/b ratio (0.30 to 0.50) prior to compaction, elements having particularly good mechanical properties in terms of their compressive strength and abrasion resistance can be achieved. On account of the good mechanical properties achieved with the method of the invention, it is possible to dispense with impregnating/sealing of the elements after compaction. Moreover, with the method of the invention, the concrete elements can be produced economically.

In one preferred embodiment of the invention, the concrete element is a concrete block, a concrete slab or a concrete step. Practical experiments have shown that the method of the invention is especially suitable for producing concrete elements of this kind. This is attributable in particular to the good mechanical properties in terms of compressive strength and abrasion resistance. Moreover, through eliminating an impregnating or sealing step, such concrete elements can be produced in a particularly economic process.

In the method of the invention it has proved to be particularly practicable if the concrete introduced into the mould has or is adjusted to, prior to curing, a water/binder (w/b) ratio of 0.31 to 0.45, more particularly to a water/binder (w/b) ratio of 0.35 to 0.40. Preferably, the (w/b) ratio of the concrete is adjusted prior to the introduction of the concrete into the mould. Ratios in this range first permit good workability for the concrete. Secondly they ensure the presence of sufficient water to cure the binder. Moreover, when the w/b ratio is adjusted within the stated range, the porosity achieved by the concrete has beneficial consequences for the compressive strength of the concrete element.

In the method of the invention, the cement fraction in the concrete layer is particularly from 15 to 25 wt %, preferably from 17.5 to 20.5 wt %, based on the overall composition of the concrete layer. It has been found that if a cement fraction of less than 15 wt % is used in the concrete layer, the concrete aggregates are not anchored firmly enough in the concrete element. Conversely, the use of a cement fraction of more than 25 wt % in the concrete layer gave mechanical properties which no longer satisfied the requirements.

In accordance with the invention, at least one portion of a granular material is applied to the concrete layer, preferably to the facing concrete layer, prior to compaction, by means of an application device. In this context it has proved to be advantageous if in the method of the invention the water/binder (w/b) ratio of the granular material or the mixture of granular material and water, prior to application to the concrete layer, is or is adjusted to 0.24 to 0.38. With a w/b ratio of the granular material within this range, good mechanical properties are achieved in the concrete element produced.

In service trials it has been found that in the method of the invention, the granular material which is applied to the concrete layer, preferably to the facing concrete layer, advantageously comprises a scatter component and binder.

In one preferred embodiment of the method of the invention, the granular material comprises the scatter component in an amount of 75 to 85 wt % and binder in an amount of 15 to 25 wt %, based in each case on the overall composition of the granular material. Through use of the scatter component and binder within these concentration ranges it is possible to achieve good anchorage of the granular material on the concrete layer, preferably on the facing concrete layer.

According to one preferred embodiment of the method of the invention, the scatter component is mixed with an organic or inorganic binder. The binder is preferably colourless and is mixed with the scatter component prior to application, wherein as organic binder, for example, an acrylate dispersion and the inorganic binder, for example, a silicate can be used.

According to a further particularly preferred embodiment, the teaching of the invention can be realized by the binder contained in the granular material being an inorganic binder such as cement, hydraulic lime, gypsum or waterglass and/or the binder being contained in the granular material in an amount of 15 to 25 wt %, based on the overall composition of the granular material. Binders of these kinds are particularly easy to handle in connection with concrete elements. Moreover, they do not provide additional requirements for the method. Furthermore, such binders ensure good anchorage of the granular material on the concrete layer, preferably on the facing concrete layer.

The statements made above concerning inorganic binders are also applicable in a similar way to organic binders. Hence one particularly advantageous embodiment of the invention provides for the binder contained in the granular material to be an organic binder such as polymer dispersions, acrylate resins, alkyd resins, epoxy resins, polyurethanes, sol-gel resins or silicone resin emulsions and/or for the binder in the granular material to be contained in an amount of 5 to 35 wt %, based on the overall composition of the granular material.

Optimum results occur in the method of the invention if as scatter component a scatter component having an average particle diameter of 0.1 to 1.8 mm is used, the binder is contained in the granular material in an amount of 5 to 35 wt %, more particularly 15 to 35 wt %, based on the overall composition of the granular material, and/or the water/binder (w/b) ratio of the granular material or the mixture of the granular material and water is or is adjusted to 0.24 to 0.33. In this way the mechanical properties of the resulting concrete elements are adapted very well to the particular requirements.

The teaching of the invention, according to a further embodiment of the method in accordance with the invention, may also be relized by using as scatter component a scatter component having an average particle diameter of 1.2 to 5 mm, the binder being contained in the granular material in an amount of 5 to 20 wt %, based on the overall composition of the granular material, and/or the water/binder (w/b) ratio of the granular material being or being adjusted to 0.28 to 0.38. This permits particularly economical production of the concrete elements.

In the method of the invention, as said scatter component preferably a scatter component having an average particle diameter of 0.1 to 1.2 mm.

As already described earlier on above, concrete elements having particularly good mechanical properties can be achieved with the method of the invention.

In one preferred embodiment of the method of the invention, the compressive strength of the cured concrete layer, preferably of the facing concrete layer, as determined according to DIN EN 13369 is in the range from 40 to 85 N/mm$^2$, preferably from 50 to 60 N/mm$^2$. A compressive strength within this range is an advantage for numerous applications. Furthermore, it ensures a long lifetime.

Moreover, in service trials, an abrasion resistance for the cured concrete layer as determined according to DIN EN 1338, Annex H or DIN 52108, of less than 18 cm$^3$/5000 mm$^2$, more particularly less than 15 cm$^3$/5000 mm$^2$, has emerged as being particularly advantageous. Abrasion resistances at this level have proved to be particularly favourable for the wear resistance of the concrete elements.

According to a further embodiment of the method of the invention, the water absorption of the cured concrete layer as determined according to DIN EN 1338, Annex E, is less than 6 mass %. A water absorption within this range is advantageous in particular for the long-term stability of the concrete elements.

The concrete layer particularly has a density of 1.5 to 2.8, preferably of 2.25 to 2.45, as determined according to DIN EN 13369.

Particularly practice-oriented results have been obtained in the method of the invention if the concrete layer is a facing concrete layer. Through this measure, the effect of the granular material applied is manifested particularly well.

In accordance with a preferred embodiment, the coloured or differently coloured concrete mixture or else the facing concrete or the concrete surface layer may polymer-modified and/or may have a silicate-concrete mixture.

In one particularly preferred embodiment of the method of the invention, the concrete layer, preferably the facing concrete layer, has a fine-grained particle structure, finer than or identical to grading curve limit C4. C4 designates a fine-grained particle structure, known to the skilled person, of grainigs between 0 and 4.0 mm diameter. Standardized siebing experiments with specified sieve meshes are carried out for the assessment.

Optimum results have occurred if, in the method of the invention, the concrete elements, preferably the concrete block or the concrete slab, has at least one further concrete layer, more particularly a rough concrete layer. In this way the mechanical properties can be adapted well to the requirements of the particular application. Moreover, a greater design freedom can be ensured in this way for the concrete element, preferably the concrete block or the concrete slab.

According to a further preferred embodiment of the method of the invention, the concrete comprises concrete additives such as slag sand, pozzolan, flyash, limestone, bituminous-coal flyash and/or silica dust. The low price of these concrete additives means that concrete elements can be produced particularly economically in this way.

In order to produce particularly aesthetically appealing concrete elements with the method of the invention, it has proved to be advantageous if the facing concrete layer has an optical property such as colour or gloss level, and the granular material has an optical property differing therefrom. As a result of this, for example, the possibility exists of producing flamed, veined or speckled surfaces, which resemble the natural structure of natural stone.

In one particularly preferred embodiment of the method of the invention, at least one portion of a coloured and/or differently coloured granular material or of a granular material which has colour and/or different colours is applied to the concrete layer, preferably to the facing concrete layer, prior to compaction, by means of at least one application device. This improves the possibility of producing flamed, veined or speckled surfaces which resemble the natural structure of natural stone. These surfaces can be produced and/or varied by variations in the application device, in the portion or portions, and in the granular material. A part is also played here by the base colour of the concrete layer, preferably of the facing concrete layer, which ranges from uncoloured concrete to differently coloured concrete.

In a particularly advantageous way, the granular material is a coloured and/or differently coloured concrete mixture which produces the particular optical qualities by virtue of its application to the surface. Because of the fact that the concrete mixture can subsequently be pressed into the surface and/or compacted there, it is possible to achieve a good bond with the surface layer or with the facing concrete layer.

Optimum results occur in the method of the invention if the granular material is applied by scattering or throwing. Advantageously the granular material is applied by throwing, slinging, shooting or blowing.

Preferebly, there may be different granular materials, differently coloured concrete mixtures, including rock particles or rock mixtures or grainings or chips or grains, contained in an applied portion.

Advantageously, however, several portions of the same or different granular material per portion may also be applied to the mould, as may several portions of the finishing material one after another to the surfaces of a mould.

In one preferred embodiment of the method of the invention, the granular material is applied to the concrete layer by means of an application device, wherein the application device has at least one trickling means, one slinger disc, one bladed wheel, one thrower arm and/or one catapult, to which at least one portion of the granular material is supplied. These application devices and those described hereinafter are able to move over the mould or alongside the mould, and may also be supplied with different portions at different time intervals. In this way the granular material can be applied uniformly to the concrete layer. It has further emerged that in this way the method of the invention can be carried out particularly economically.

In the method of the invention, advantageously, the application device has at least one metering container, comprising a granular material, with a metering strip, where the metering container is guided over the mould at uniform or non-uniform speed.

Vibrations or jolting impacts are preferably exerted on the metering strip during this procedure, and may be exerted uniformly and/or non-uniformly and/or intermittently.

Different finishing materials and/or different portions of finishing material may preferably be supplied to the metering strip along its extent.

It has also proved advantageous, moreover, if the metering container is mounted on the front edge of the metering carriage for the concrete, preferably for the facing concrete.

According to one particularly preferred embodiment of the method of the invention, the application device has at least one pipe socket, to which one or more portions of a granular material are supplied and through which they are scattered, thrown, shot and/or dropped onto the concrete layer, preferably onto the facing concrete layer. Particularly effective distribution onto the mould is produced if the pipe socket end is designed in the manner of a nozzle.

Practical experiments have shown that in the method of the invention a further contribution to effective distribution is made if the throw-out takes place by means of a pre-tensioned, spring-loaded piston, whose locking is disengaged suddenly for the throwing operation.

The application device may preferably be moved over the mould or alongside the mould. At the same time it may exhibit or attain different speeds of movement, wherein a jerky movement may also be advantageous. Depending on the size of the mould and depending on the colour charge of the application device with granular material, it is also possible for several devices, and also for different devices, to be utilized for one mould, in order to even out the application or achieve a specific, characteristic aplication pattern of the granular materials to the layers.

With the application devices, guide plates are preferably used, since such disc wheels or thrower arms and also pipe sockets can have a greater scattering range.

A plurality of portions of the granular material may be thrown out one after another by the application devices, wherein the materials in question may be different granular materials, as described above.

The granular material may also have or comprise small rock particles, allowing the introduction into the surface or facing concrete layer of different kinds of materials with different colours, including grainings of semi-precious stones or precious stones or mica or metal chips or polymeric particles or glass particles. The granular material may also be any desired rock mixture.

It has proved to be particularly practicable in the method of the invention for the scatter material to be or comprise a rock mixture. It is possible herewith to produce concrete elements which come very close to the appearance of natural stone.

In the method of the invention, preferably, the scatter material comprises at least material selected from the group consisting of semi-precious stones, precious stones, mica, metal chips, glass and polymeric particles. Using these materials allows a very economic method.

In one preferred embodiment of the method of the invention, the granular material may have a graduated particle composition of max. 2 mm particle diameter.

Before, but preferably after, the compacting, an organic or inorganic agent, which is preferably colourless, may be applied to the surfaces of the concrete elements before or after curing. This operation involves impregnating, sealing or coating the concrete elements. According to a further preferred embodiment of the method of the invention, a sealing and/or impregnating agent is applied to the surface of the concrete elements after compacting. An approach of this kind adds a further protective layer to the concrete elements, that additionally further increases the durability and lifetime of the concrete elements. This layer may also act as stain protection and prevent lime efflorescence.

In one particularly preferred embodiment of the method of the invention, the surfaces and/or the edges of the concrete blocks or concrete slabs, after compacting and before curing, are advantageously worked with brushes and in the process textured and/or roughened and/or smoothed and/or have protrusions on their edges worked off. In one preferred embodiment of the method of the invention, the surfaces and/or the borders of the surfaces of the concrete blocks or concrete slabs are worked with brushes after final compaction and before sealing, and in the process are structured and/or roughened and/or smoothed and/or have protruding edges worked off.

The invention, furthermore, also relates to concrete blocks or concrete slabs which are obtainable by the method described above.

For further elucidation of the invention, reference is made to the drawing, which shows in simplified form one exemplary embodiment of the invention.

FIG. 1: shows a perspective view of a template with a mould, with concrete blocks and an application device.

Identified by 1 in the single figure is a template on which there is a mould arranged which is identified by 2. The mould 2 has a fairly large number of continuous openings (35 of them in the figure), into which rough concrete is introduced, to which there is applied, visibly, a facing concrete layer identified by 3, having a water/binder (w/b) ratio of 0.35, a particle size maximum of 4 mm and a cement fraction in the facing concrete layer of 19 wt %, based on the overall composition of the facing concrete layer. The facing concrete layer is coloured, not apparent from the figure.

Furthermore, 4 generally identifies an application device which includes a slinger disc identified by 5. The plane of the slinger disc is approximately parallel to the surface of the mould 2 and oriented at a distance from said mould. The application device 4 is able to move along the side arranged in the figure, and also along the other sides of the mould, allowing all facing concrete layers 3 to be reached arbitrarily. Arranged above the slinger disc 5 is a hopper, identified by 6, in which granular material—not visibly—has been introduced. At its end (not visible) facing the slinger disc 5, the hopper 6 has a device for opening and closing the hopper aperture, allowing any desired portions of the granular material to be guided onto the slinger disc. In the present example, the granular material has a water/binder (w/b) ratio of 0.24 and contains 80 wt % scatter component with an average particle diameter of 0.7 mm and 20 wt % binder. It is possible for a plurality of hoppers to be arranged above the slinger disc, containing different granular materials, in order to allow the surfaces of the facing concrete layers 3 to be bombarded with different granular materials at different meterings. The rotary speed of the slinger disc 5 and its height position relative to the mould 2 can also be adjusted and varied arbitrarily, even during the throwing movement, as can the speed of movement along the mould. In this way, concrete slabs having a compressive strength of the cured concrete layer, as determined according to DIN EN 13369, of 47 N/mm$^2$ were produced. Moreover, the cured concrete layer of the concrete slabs had an abrasion resistance according to DIN EN 1338, Annex H, of 8 cm$^3$/5000 mm$^2$. In addition, the cured concrete layer of the concrete slabs had a density of 2.28 according to DIN EN 13369, and absorbed 4.4 mass % of water according to DIN EN 1338, Annex E.

7, moreover, identifies a guide means which prevents the arbitrary throwing-off of granular material by the slinger disc, especially outside of the mould 2, and steers the throwing direction onto the mould 2.

LIST OF REFERENCE NUMERALS

1 template
2 mould
3 facing concrete layers
4 application device
5 slinger disc
6 hopper
7 guide means

The invention claimed is:

1. A method for manufacturing one or more concrete elements having at least one concrete layer, the method comprising:
   introducing a concrete forming a concrete layer into a mold;
   applying at least one portion of a granular material to the concrete layer using an application device;
   compacting the concrete layer by vibration and/or tamping; and curing the concrete layer to produce a concrete element; wherein the at least one portion of a granular material is applied to the concrete layer prior to compacting the concrete layer;
   wherein the concrete layer is cured subsequent to compacting the concrete layer; wherein the concrete forming the concrete layer that is introduced into the mold has a water/binder (w/b) ratio of 0.30 to 0.50 prior to curing; and wherein the granular material comprises (a) a scatter component having an average particle diameter of 0.1 to 5 mm in an amount of 65 to 95 wt % based on the overall composition of the granular material; and (b) a binder in an amount of 5 to 35 wt % based on the overall composition of the granular material, wherein a cement fraction in the concrete forming the concrete layer is 15 to 25 wt % based on the overall composition of the concrete layer.

2. The method of claim 1, wherein the concrete element is a concrete block, a concrete slab, a concrete step, or any combination thereof.

3. The method of claim 1, wherein the concrete forming the concrete layer that is introduced into the mold prior to curing has a water/binder (w/b) ratio of 0.31 to 0.45.

4. The method of claim 3, wherein the concrete forming the concrete layer that is introduced into the mold prior to curing has a water/binder (w/b) ratio of 0.35 to 0.40.

5. The method of claim 1, wherein the cement fraction in the concrete layer is 17.5 to 20.5 wt %, based on the overall composition of the concrete layer.

6. The method of claim 1, wherein the water/binder (w/b) ratio of the granular material, prior to application to the concrete layer, is 0.24 to 0.38.

7. The method of claim 1, wherein the granular material comprises (a) a scatter component in an amount of 75 to 85 wt % based on the overall composition of the granular material, and (b) a binder in an amount of 15 to 25 wt % based on the overall composition of the granular material.

8. The method of claim 1, wherein the binder is an inorganic binder.

9. The method of claim 8, wherein the inorganic binder is selected from the group consisting of cement, hydraulic lime, gypsum and waterglass.

10. The method of claim 1, wherein the binder is an organic binder.

11. The method of claim 10, wherein the organic binder is selected from the group consisting of polymer dispersions, acrylate resins, alkyd resins, epoxy resins, polyurethanes, sol-gel resins and silicone resin emulsions.

12. The method of claim 1, wherein the binder is contained in the granular material in an amount of 15 to 35 wt %, based on the overall composition of the granular material.

13. The method of claim 1, wherein the scatter component has an average particle diameter of 0.1 to 1.8 mm.

14. The method of claim 12, wherein the binder is contained in the granular material in an amount of 15 to 25 wt %, based on the overall composition of the granular material.

15. The method of claim 6, wherein the water/binder (w/b) ratio of the granular material, prior to application of the concrete layer, is 0.24 to 0.33.

16. The method of claim 1, wherein the scatter component has an average particle diameter of 1.2 to 5 mm.

17. The method of claim 1, wherein the binder is contained in the granular material in an amount of 5 to 20 wt %, based on the overall composition of the granular material.

18. The method of claim 6, wherein the water/binder (w/b) ratio of the granular material, prior to application of the concrete layer, is 0.28 to 0.38.

19. The method of claim 1, wherein the scatter component has an average particle diameter of 0.1 to 1.2 mm.

20. The method of claim 1, wherein the compressive strength of the cured concrete layer as determined according to DIN EN 13369 is in the range from 40 to 85 N/mm$^2$.

21. The method of claim 20, wherein the compressive strength of the cured concrete layer as determined according to DIN EN 13369 is in the range from 50 to 60 N/mm$^2$.

22. The method of claim 1, wherein the abrasion resistance of the cured concrete layer as determined according to DIN EN 1338, Annex H or DIN 52108, is less than 18 cm$^3$/5000 mm$^2$.

23. The method of claim 22, wherein the abrasion resistance of the cured concrete layer as determined according to DIN EN 1338, Annex H or DIN 52108, is less than 15 cm$^3$/5000 mm$^2$.

24. The method of claim 1, wherein the water absorption of the cured concrete layer as determined according to DIN EN 1338, Annex E, is less than 6 mass %.

25. The method of claim 1, wherein the concrete layer has a density of 1.5 to 2.8 as determined according to DIN EN 13369.

26. The method of claim 25, wherein the concrete layer has a density of 2.25 to 2.45 as determined according to DIN EN 13369.

27. The method of claim 1, wherein the concrete layer is a facing concrete layer.

28. The method of claim 1, further comprising producing a second concrete layer wherein the second concrete layer is a rough concrete layer.

29. The method of claim 1, further comprising adding one or more concrete additives to the concrete layer, wherein the one or more concrete additives are selected from the group consisting of slag sand, pozzolan, flyash, limestone, bituminous-coal flyash, and silica dust.

30. The method of claim 27, wherein the facing concrete layer has an optical property such as color or gloss level and the granular material has an optical property different therefrom.

31. The method of claim 1, wherein the granular material is applied by scattering or throwing.

32. The method of claim 1, wherein the granular material is applied to the concrete layer using an application device, wherein the application device has at least one trickling means, one slinger disc, one thrower arm and/or one catapult, to which at least one portion of the granular material is supplied.

33. The method of claim 1, wherein the application device has at least one metering container, comprising a granular material, with a metering strip, and wherein the method further comprises guiding the metering container over the mold at uniform or non-uniform speed.

34. The method of claim 1, wherein the application device has at least one pipe socket to which one or more portions of a granular material are supplied and wherein the method further comprises scattering, throwing, shooting, and/or dropping granular material onto the concrete layer using the application device.

35. The method of claim 1, wherein the scatter component comprises a rock mixture.

36. The method of claim 1, wherein the scatter component comprises at least a material selected from the group consisting of semi-precious stones, precious stones, mica, metal chips, glass and polymeric particles.

37. The method of claim 1, further comprising applying a sealing and/or impregnating agent to the surface of the concrete layer after compacting the concrete layer.

38. The method of claim 1, further comprising working the surfaces and/or edges of the concrete elements with brushes after compacting and before curing the concrete layer, wherein said working produces surfaces and/or edges that are textured, roughened, smoothed and/or have protrusions on their edges worked off.

* * * * *